United States Patent Office 3,143,330
Patented Aug. 4, 1964

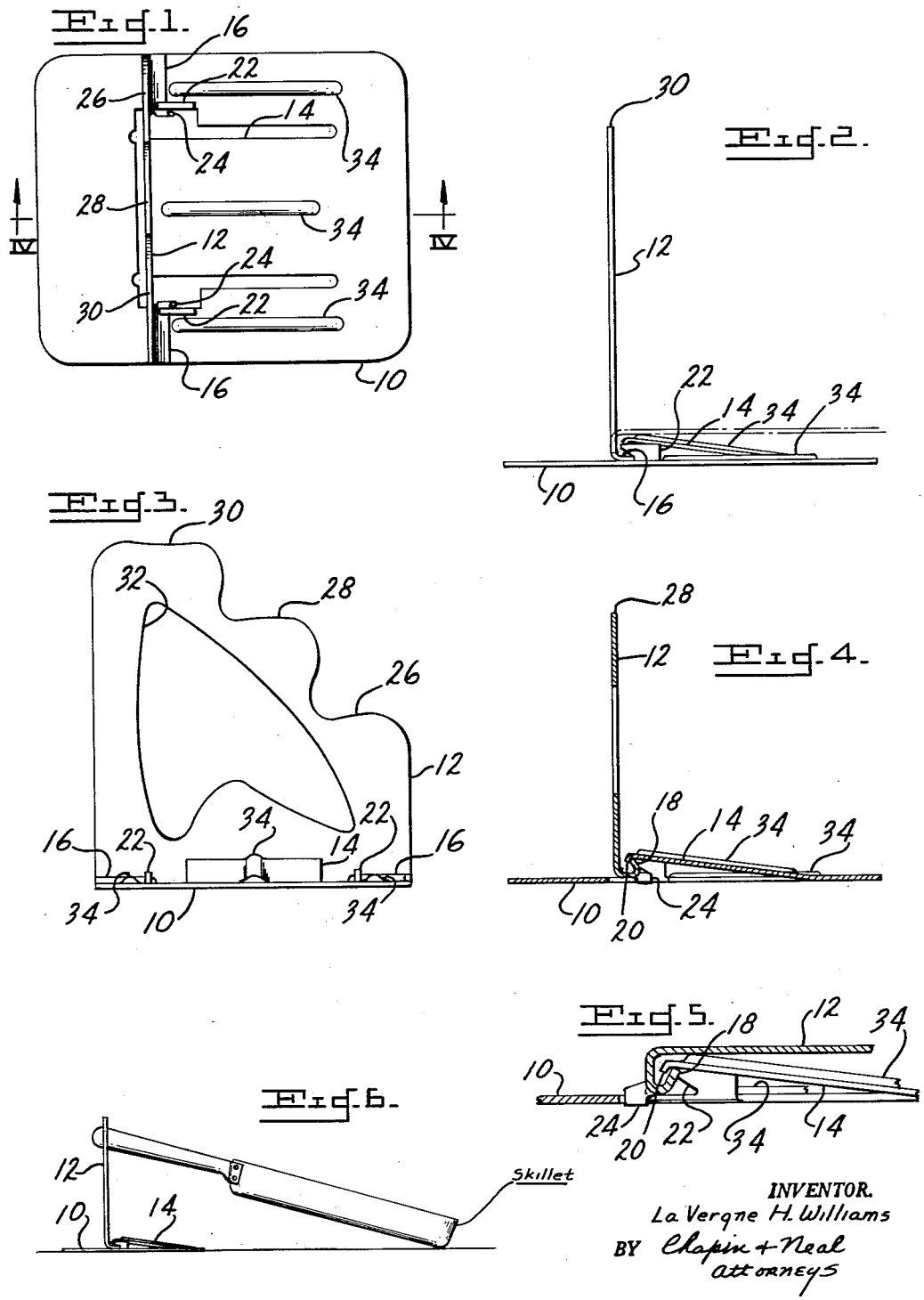

3,143,330
SKILLET TIPPER
La Vergne H. Williams, Columbia, Conn., assignor to Gunver Manufacturing Company, Manchester, Conn., a corporation of Connecticut
Filed July 17, 1962, Ser. No. 210,520
3 Claims. (Cl. 248—351)

The present invention relates to an improved device for tipping skillets or the like.

Many persons find it desirable, when frying food, to tip the skillet so that the fat or grease may drain away from the food before it is removed from the skillet and served. Many do this by pushing the food toward the handle of the skillet and manually holding it at an angle. This is tedious and the tendency is to remove the food before the fat is fully drained therefrom. Others employ various makeshift propping arrangements which are more or less hazardous because of the danger of fire or the likelihood of burning one's fingers.

The object of the present invention is to provide a simple and convenient device for maintaining a skillet in a tilted position, as grease is drained from the food that has just been cooked.

This end is attained by the provision of a device comprising a base and a support plate. In use the support plate is upright and has a surface for receiving the handle of a skillet and holding it in an elevated position tipping the skillet to the desired angle. The support plate folds against the base for convenience in handling and storage. Preferably spring means formed integrally with the base and support plate yieldably maintain the support plate in its upright and folded positions.

The above and other related objects and features will be apparent from a reading of the following description of the disclosure found in the accompanying drawing and the novelty thereof pointed out in the appended claims.

In the drawing:

FIG. 1 is a plan view of my device;

FIG. 2 is a side elevation thereof with a phantom showing of the support plate in its folded position;

FIG. 3 is an end elevation thereof;

FIG. 4 is a section taken on line IV—IV in FIG. 1;

FIG. 5 is a fragmentary view, on an enlarged scale, also taken on line IV—IV in FIG. 1, but with the support plate in its folded position; and FIG. 6 is an elevation, on a reduced scale, showing this device in use.

Referring to FIGS. 1–4 the present device comprises two parts, a base 10 and a support plate 12, which are preferably and economically formed of sheet metal as stampings. The base 10 has a tongue 14 struck therein which serves as a spring and is referred to as such.

At the lower end and on each side of the plate 12 are inwardly bent tabs 16 at right angles to the upright portion of the plate 12. The tabs 16 position the plate 12 in an upright position on the base 10 which position is yieldably maintained by the spring 14 engaging a ledge 18. The ledge 18 is formed by a reversely bent portion of plate 12 at the lower end thereof between the tabs 16. Preferably the outer end of spring 14 is provided with a downturned lip 20 which is received in the channel formed by the reversely bent ledge to assist in maintaining the base 10 and plate 12 in assembled relation.

Lugs 22 are bent upwardly from the base 10 and have undercut portions respectively overlying the tabs 16. The lugs 22 thus also assist in maintaining the base 10 and plate 12 in assembled relation and also insure that the plate 12 will be tilted only towards spring 14 when folded against the base 10.

It will be seen that when the plate 10 is tilted in this direction, it actually pivots about the free ends of the tabs 16. As this occurs, the ledge 18 is raised slightly so that the spring 14 is further stressed. It will, therefore, be apparent that not only does the spring 14 maintain the plate 12 upright, but actually there was a detent arrangement which more positively maintains this upright position. Continued tilting movement will bring the plate 12 to the phantom position seen in FIG. 2, with reference also to FIG. 5. In this folded position, it will be seen that the ledge 18 is undercut sufficiently to receive the lip 20 to again assist in maintaining the base 10 and plate 12 in assembled relation.

While there is an opening in the base 10 on the three free sides of the spring 14, such opening is not necessarily required in the functional operation of the device. However, in the illustrated embodiment, lugs 24 are bent downwardly from the tabs 16 and engage opposite sides of this opening to prevent lateral shifting of the plate 12 relative to the base 10. Also, there is a tendency for the plate 12 to shift outwardly of the spring 14 in folded position, illustrated in FIGS. 2 and 5. This outward shifting movement is limited by the lugs 24 engaging the rear of this named opening in the base 10. The lugs 24, bearing against the rear of this opening, also prevent any possible cocking of plate 12 as it is tilted to its upright position. It will also be apparent from the point of engagement of spring 14 with ledge 18 relative to the ends of tabs 16 that there is a detent action yieldably maintaining the plate 12 in its folded position.

Referring more specifically to FIG. 3, it will be seen that plate 12 is provided with three supporting surfaces 26, 28 and 30, at different levels. Also, the plate 12 is apertured at 32 for decorative purposes and also to reduce the weight of the device.

With the plate 12 in its upright position, the present tilting device may be placed on any reasonably level surface, which will usually be the top of a stove adjacent a burner. The skillet is usually, though not necessarily, removed from the burner and the handle rested on one of the surfaces 26, 28 or 30, whichever gives the desired angle of tilt to the particular size of skillet being used. In FIG. 6 the handle of the skillet is resting on the intermediate surface 28. After the fat or grease has drained sufficiently, the fried food may be removed from the skillet. It will be appreciated that by using the present device, the skillet may be kept in a tilted position as long as desired without any danger or need for attention.

After use, the tilting device can be picked up practically immediately without danger of being burned, since it contacts only the relatively cool handle of the skillet and is made of sheet metal which rapidly dissipates the heat. The plate 12 may be folded against the base 10 and the titling device then stored in a drawer or cabinet without requiring any great amount of space.

The parallel ribs 34, seen on the base 10, are merely for reinforcing purposes. The use of such expedients, as well as other modifications obvious to those skilled in the art, do not represent a deviation from the present inventive concepts set forth in the claims.

Having thus described the invention, what is claimed as novel and desired to be secured by Letters Patent of the United States is:

1. A device for tilting skillets or the like to drain fried foods before they are removed from the skillet, said device comprising a generally flat sheet metal base having a spring-forming tongue struck therein, a sheet metal support plate having at its lower end and on opposite sides thereof bent tabs directed towards said spring and at right angles to said support plate, said base having integral undercut lugs overlying said tabs, said plate also having a ledge-like projection lying above said base and projecting towards said spring roughly half the distance as said tabs, said spring being sprung into engagement with the upper surface of said ledge to yieldably maintain the support plate upright, said support plate being tiltable to a folded position overlying said base and releasably maintained in said folded position by continued engagement of said deflected spring with said ledge, said plate having a supporting surface at the upper end thereof for receiving the handle of a skillet and thereby maintaining a skillet in a tilted position.

2. A device as in claim 1 wherein the ledge is in the form of an upwardly open hook and the spring has a depending lip which catches on said hook in both the upright and folded positions of said plate to prevent its disassembly from said base.

3. A device as in claim 1 wherein an opening is provided in said base underlying the lower end of said plate, said plate having depending lugs engaging opposite sides of said opening to prevent lateral shifting of the plate relative to the base, said lugs also engaging the rear of said opening opposite said spring to prevent disassembly of the plate from the base and further wherein said undercut lugs comprise upwardly bent portions of said base at opposite sides of said opening and said plate has a plurality of supporting surfaces at progressively higher levels.

References Cited in the file of this patent

UNITED STATES PATENTS

| | | |
|---|---|---|
| 470,334 | Karo | Mar. 8, 1892 |
| 510,896 | Crane | Dec. 19, 1893 |
| 2,307,914 | Bitney | Jan. 12, 1943 |
| 2,720,985 | Jauch | Oct. 18, 1955 |
| 2,857,618 | Jordan | Oct. 28, 1958 |

FOREIGN PATENTS

| | | |
|---|---|---|
| 512,420 | Great Britain | Sept. 15, 1939 |